United States Patent [19]

Sliski

[11] 4,043,358

[45] Aug. 23, 1977

[54] FLAPPER CHECK VALVE

[75] Inventor: Chester Sliski, Trenton, N.J.

[73] Assignee: Victaulic Company of America, South Plainfield, N.J.

[21] Appl. No.: 654,626

[22] Filed: Feb. 2, 1976

[51] Int. Cl.² ............................................. F16K 15/03
[52] U.S. Cl. ................................. 137/512.1; 137/527
[58] Field of Search ................. 137/512.1, 527, 527.2, 137/527.4, 527.6, 527.8, 512.15, 515.5, 517, 518

[56] References Cited

U.S. PATENT DOCUMENTS

| | | | |
|---|---|---|---|
| 3,023,771 | 3/1962 | Hinds | 137/512.1 X |
| 3,026,901 | 3/1962 | Wheeler, Jr. | 137/512.1 X |
| 3,374,804 | 3/1968 | Stegerud | 137/512.1 |
| 3,538,946 | 11/1970 | Hilsheimer | 137/512.1 |
| 3,612,098 | 10/1971 | Bora et al. | 137/527 |
| 3,678,958 | 7/1972 | Satterwhite | 137/512.1 |
| 3,934,608 | 1/1976 | Guyton | 137/527.8 |
| 3,937,168 | 2/1976 | Doak | 137/527.8 X |

Primary Examiner—William R. Cline
Attorney, Agent, or Firm—Brooks, Haidt, Haffner & Delahunty

[57] ABSTRACT

Two half-discs of a flapper type check valve are mounted on an internally supported shaft in a two piece valve body to swing from a coplanar closed position to a back-to-back relationship when the valve is fully open. Stops integrally formed within a bell-shaped downstream part of the valve body engage mating parts of the half-discs when the valve is in fully open condition with the half-discs so positioned behind a transverse rib that there is no interference with flow. The two pieces of the valve body each have external circumferential grooves for easy attachment to other piping elements.

12 Claims, 7 Drawing Figures

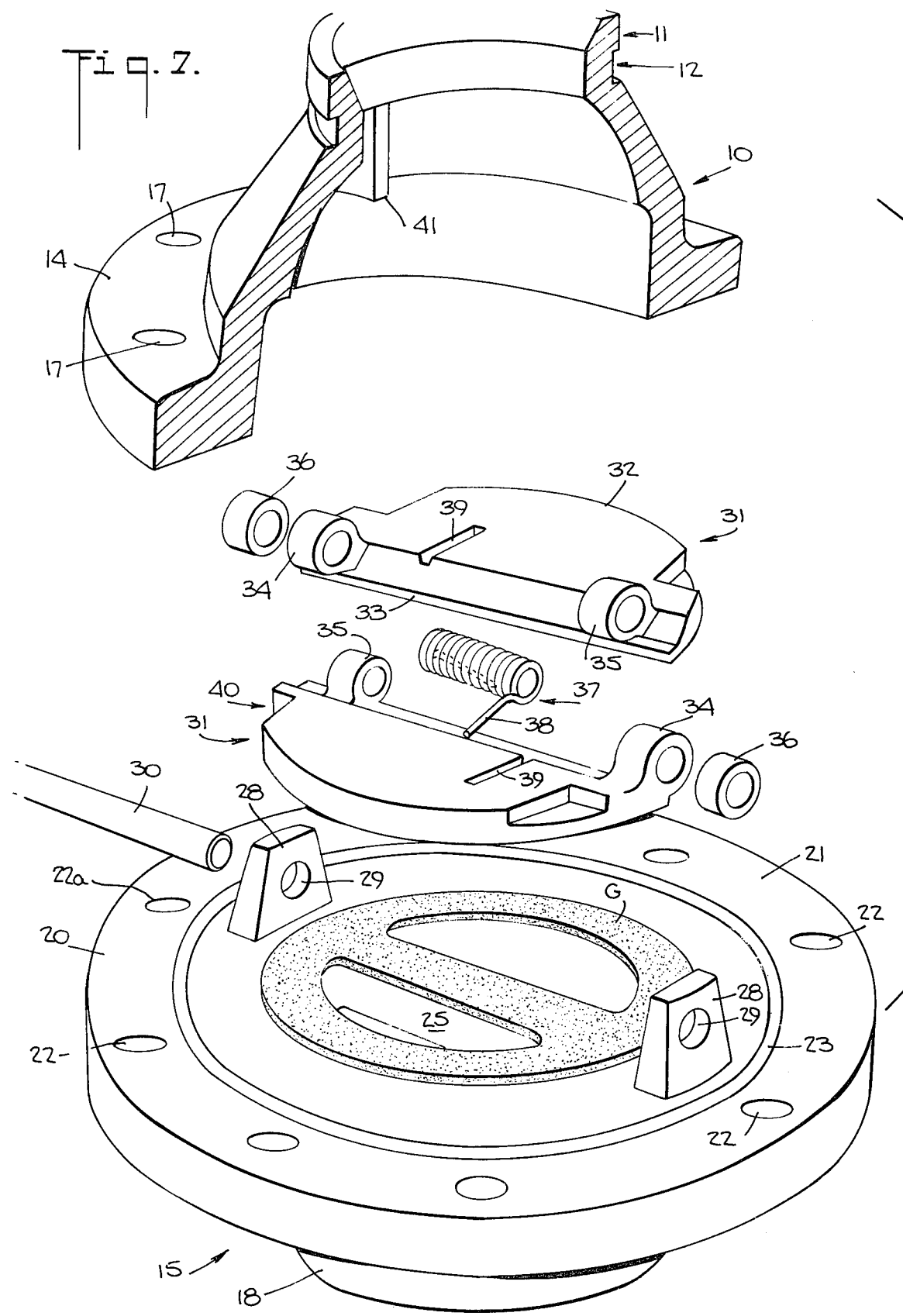

FLAPPER CHECK VALVE

BACKGROUND OF THE INVENTION

1. Field of the Invention

The invention relates to check valves of the flapper type.

2. Description of the Prior Art

There are a number of commercially available flapper type check valves having spring loaded half-discs for limiting flow in a piping system to one direction. Those valves are typically of a "wafer" design to fit between pipe end flanges. Among the prior art flapper valves are those of U.S. Pat. Nos. 3,007,488; 3,026,901; 3,072,141; 3,074,427; 3,452,778 and 3,678,958.

Prior art valves of the wafer type are adapted for attachment to flanged pipe ends or flanged piping appurtenances and cannot be directly joined to elements having no flanges. Thus two wafer type elements such as a wafer check valve and a wafer butterfly valve cannot be joined together unless an intermediate flanged item is positioned between them. With the modern extensive use of grooved piping elements, it has become desirable to provide a grooved end valve which can be joined to another grooved pipe element.

Conventional check valves often have points of possible leakage. In some valves, stops for the valve discs are separate pieces attached to the valve body by fasteners around which leakage can occur. When the hinge shaft of a valve extends through the exterior wall of the valve body there is a possible leakage area at the shaft ends.

Another problem in the use of conventional check valves with one piece valve bodies is that inspection and replacement of the seal, which is bonded to a seat within the body requires working in a "well" where access is awkward.

These and other disadvantages of known check valves are overcome by the provision of a valve according to the present invention.

SUMMARY OF THE INVENTION

The flapper check valve of this invention has a two-piece valve body or housing. One of the two parts of the valve body includes a valve seat and a transverse center supporting sealing rib as well as mounting means for the shaft which carries two pivotally mounted spring biassed half-discs. The other part of the valve body, which in operation is the downstream portion of the valve body, is generally bell-shaped, with ample internal space for good free flow of fluid when the valve is open, and has integrally formed internal stops against which the half-discs of the flapper valve rest when the valve is fully open.

In the presently preferred embodiment of the invention, the valve is adapted for use in a grooved-end piping system, each portion of the valve body having an external circumferential groove for attachment to another piping element by means of any of a variety of pipe couplings. The valve is particularly suited to attachment by means of couplings manufactured and distributed by Victaulic Company of America.

The two parts of the valve housing or body are secured together by means of a plurality of bolts. The two-piece structure of the housing has the advantage that the shaft upon which the spring loaded half-discs are mounted for pivoting movement is completely enclosed within the assembled valve body without any openings in the housing wall which might result in leakage. An O-ring seal between the two body portions prevents leakage at the joint therebetween.

The half-discs of the valve are formed with hinge members extending outwardly from their downstream faces to pivot about the shaft. Each half-disc also has a pair of recesses which allow the half-discs to lie back-to-back against stop elements when the valve is fully open, with the stops fitting within the recesses. The half-discs also preferably have slots in their downstream faces for reception of the ends of a coiled spring which urges the half-discs toward closed position.

The stops are not separate members secured to the valve body, but are integrally formed within the bell-shaped downstream portion of the body. These stops are so positioned that they do not significantly interfere with flow and when the half-discs are folded back against the stops the cross-sectional flow area is no more restricted than required by the transverse rib upstream of the half-discs.

These and other objects and advantages of the flapper check valve of the invention will be more fully appreciated by reading the following detailed description of a preferred embodiment, especially when the description is read in conjunction with the accompanying drawing.

BRIEF DESCRIPTION OF THE DRAWING

In the drawing in which like reference characters designate like parts throughout:

FIG. 7 is an exploded view in perspective of the valve of the invention.

DETAILED DESCRIPTION OF A PREFERRED EMBODIMENT

Figure 1:
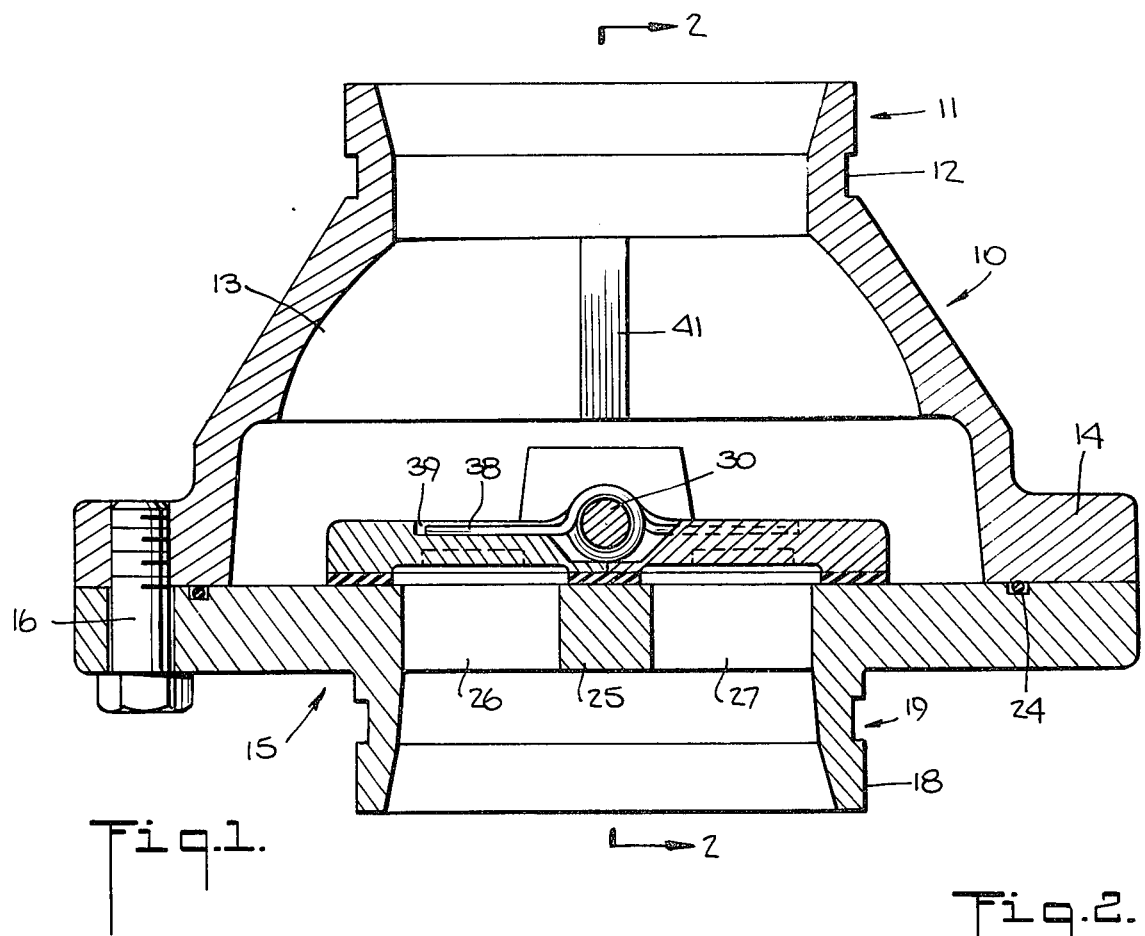
FIG. 1 is view of the valve of the invention in section, looking in the direction of the shaft.
Figure 2:
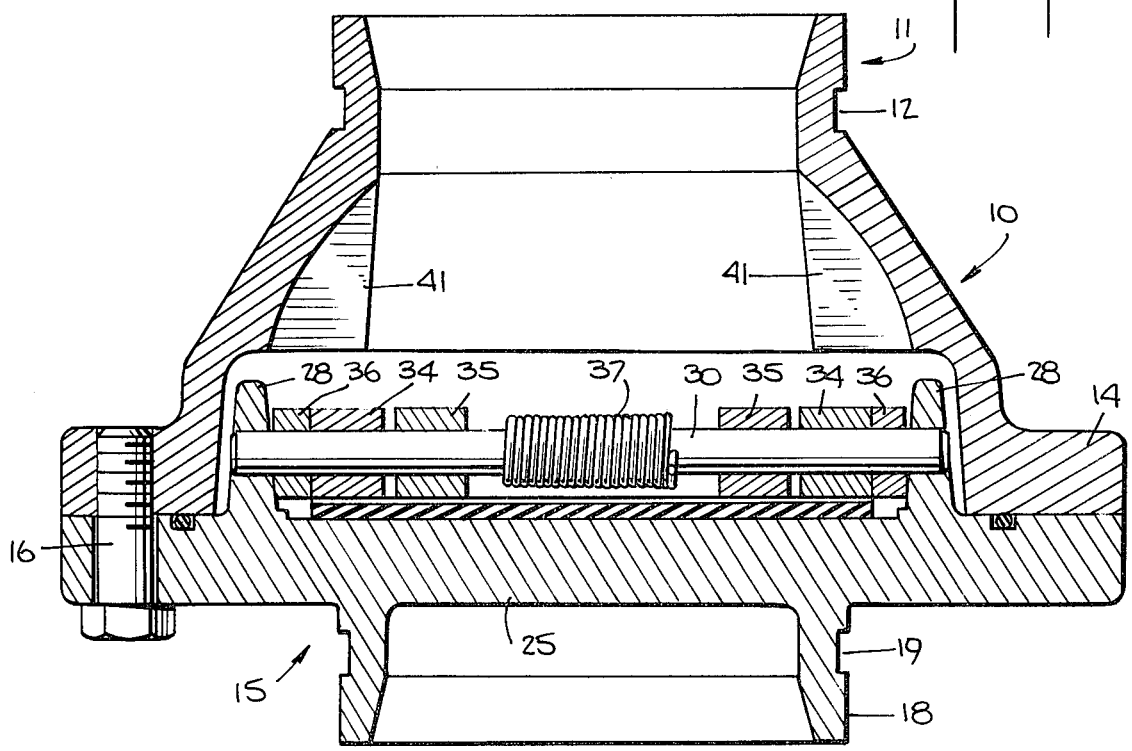
FIG. 2 is a view in section perpendicular to that of FIG. 1 taken along line 2—2 of FIG. 1 and looking in the direction of the arrows.

The flapper check valve of the present invention, as shown in the various figures of the drawing has a two piece body or housing. The downstream portion 10 of the valve body, shown uppermost in FIGS. 1, 2, 4, 5 and 7 is generally bell-shaped. The tubular end 11 of the body portion 10 is encircled by a groove 12 for attachment by means of a coupling (not shown) to a pipe or piping appurtenance.

The body portion 10 widens from the end 11 to enclose a flow chamber 13, and there is a peripheral flange 14 for joining the bell-shaped body portion 10 to the other part 15 of the valve body by means of a plurality of bolts 16. Bolt holes 17 in the flange 14 are threaded to receive the threaded ends of the bolts 16.

The upstream portion 15 of the valve body has a tubular end section 18 provided with an external circumferential groove 19 like the groove 12 for securing the valve to a pipe or piping system element by means of a suitable coupling. The grooves 12 and 19 are shown to be generally rectangular in cross-section with flat bottoms and straight side walls.

Figure 3:
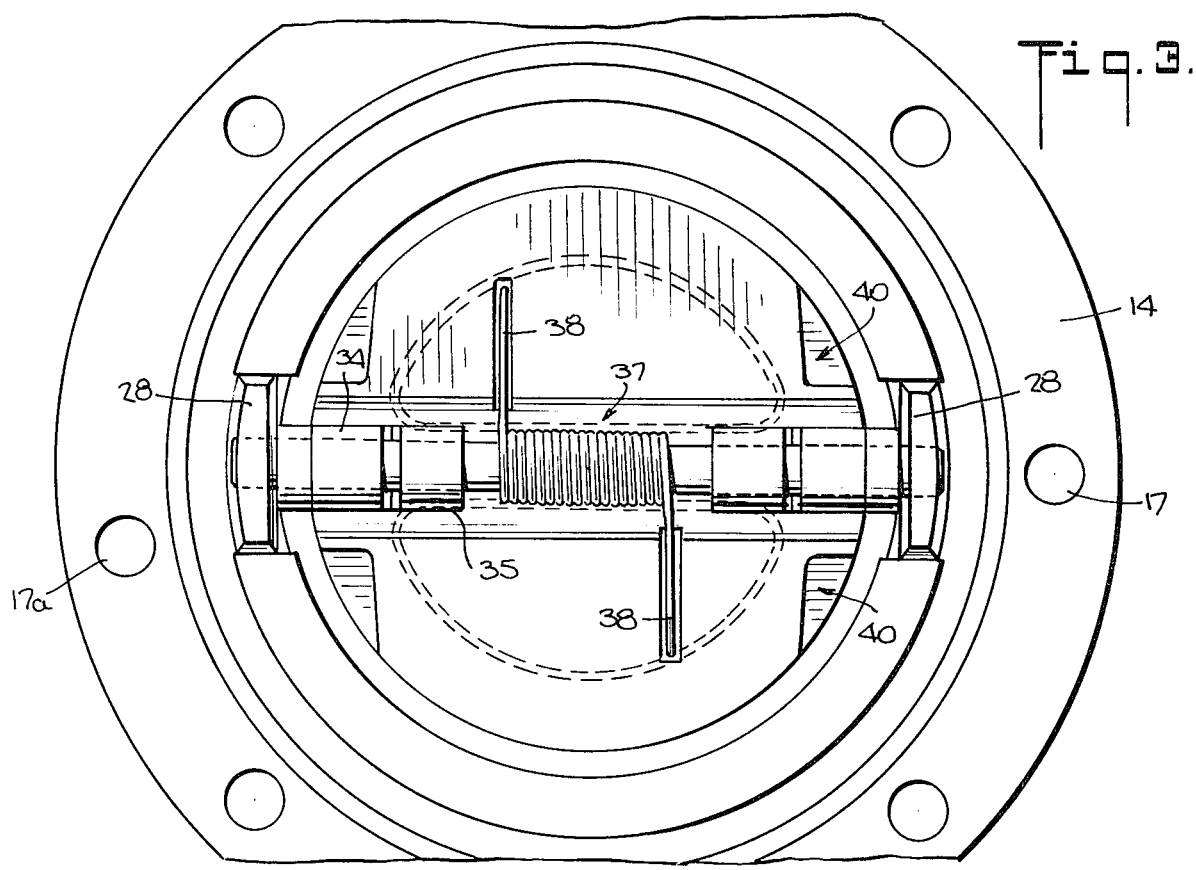
FIG. 3 is a view in elevation looking upstream through the valve with some hidden structures shown by broken lines.
Figure 6:
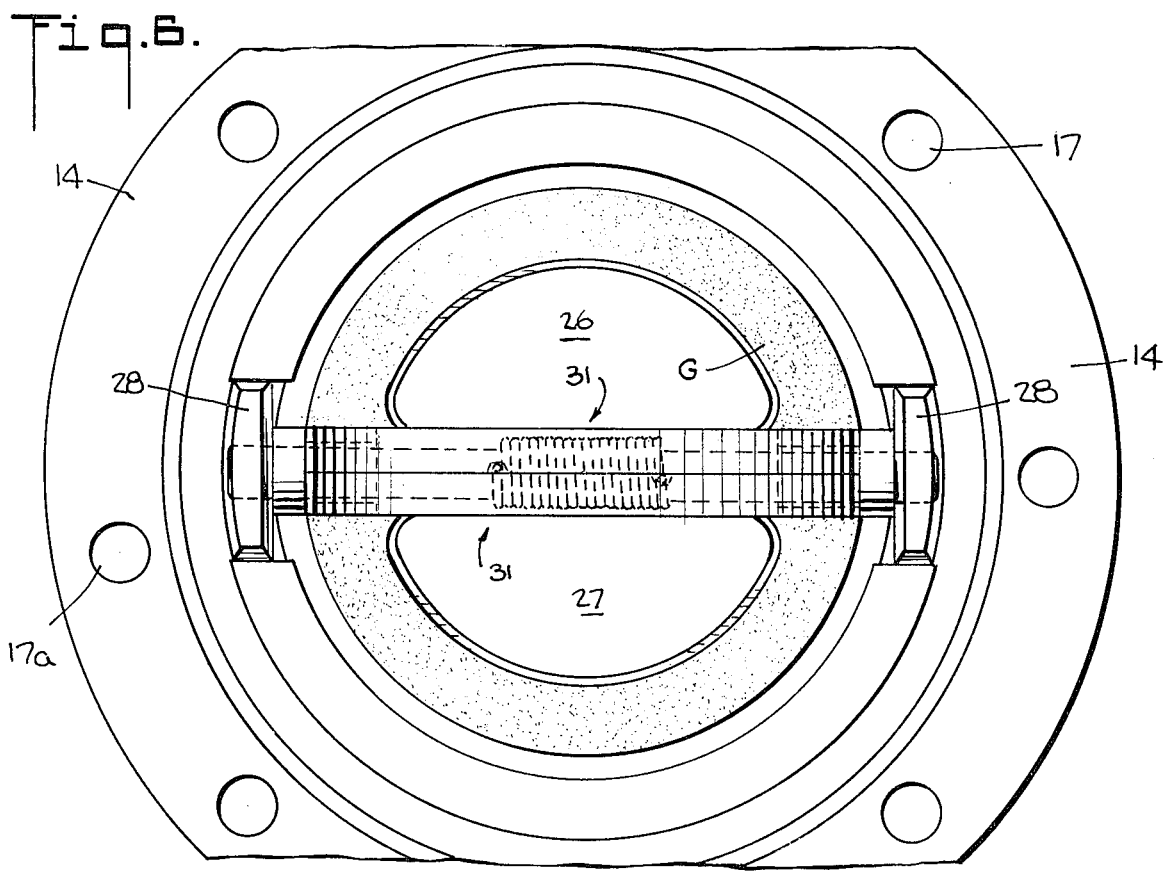
FIG. 6 is a view similar to FIG. 3 but with the valve open.

An annular peripheral flange 20 of the body portion 15 extends to the same outer diameter as the flange 14 and has bolt holes 22 aligned with the holes 17 for reception of the body joining bolts 16. It will be noticed that one pair of bolt holes 17a and 22a shown in FIGS. 3 and 6 are not evenly spaced from the adjacent holes to assure proper alignment of the body portions 10 and 15 when the valve is assembled. A circular groove 23 is provided in inner face 21 of the flange 20 to hold an O-ring seal 24 to prevent leakage at the joint between the body portions 10 and 15.

Figure 4:
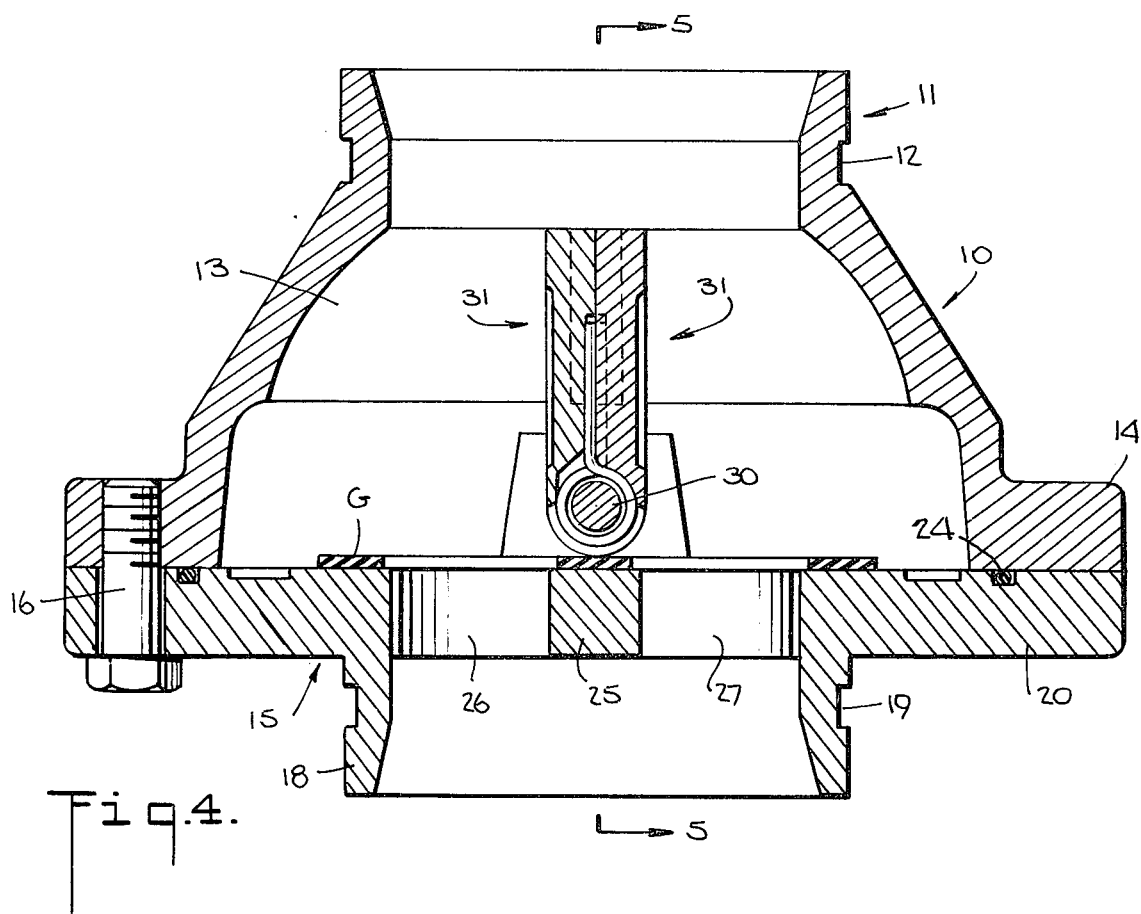
FIG. 4 is a view similar to that of FIG. 1 but with the valve open.

A central supporting sealing rib 25 extends diametrically across the passage through the upstream valve body section 15 as shown in FIGS. 1, 2, 4, 5 and 7, spaced within the body portion 15 into two almost semi-circular passages 26 and 27 as best seen in FIGS. 1 and 4. The rib 25 has a flat surface coplanar with the inner face 21 of the body portion 15 providing a continuous valve seat around the passages 26 and 27. FIGS. 6 and 7 best show the placement of a flat gasket having the general shape of a divided circle and overlying the valve seat.

The working elements of the valve are mounted on the upstream portion 15 of the valve body to open and close the passages 26 and 27. The flow chamber 13 defined within the body portion 10 is large enough to permit free movement of these working members. As shown in the various figures of the drawings a pair of hinge ears 28 having aligned holes 29 extend forward from the inner face 21 of the body portion 15 into the flow chamber 13. The hinge ears are located beyond opposite ends of the diametral rib 25, so that a cylindrical valve shaft 30 with its ends fitted in the holes 29 lies in spaced, parallel relationship to the inner face of the rib 25. As shown in the drawing there is some clearance between the ends of the shaft 30 and the inner wall of the bell-shaped body portion 10.

Half-discs 31, by pivoting motion about the shaft 30 serve to open and close the valve. Since these half-discs 31 are preferably identical, only one of them will be described. Attention is particularly directed to the perspective view of FIG. 7, showing the structure of the half-discs 31 in some detail. The half-disc 31 has an arcuate outer edge 32 and a straight inner edge 33 generally defining a semi-circular profile. Hinge ears 34 and 35 extend outwardly from the downstream face of the half-disc 31.

The ears 34 and 35 are integrally formed with the half-disc 31. As shown in FIG. 7, the inner edge 33 of the half-disc 31 slants toward the downstream face, preferably at an angle slightly less than 45° and the ears extend outward at a similar angle, so that when the two half-discs 31 are assembled with their ears 34 and 35 on the shaft 30 the upstream face is essentially a complete circle, closing off the passages 26 and 27.

It will be seen that the hinge ear 34 is at the end of the inner edge 33 of the half-disc 31 but the other ear 35 is spaced closer to the center so that in assembled relationship the two ears 35 are between and slightly spaced from the ears 34. Bushing 36 are fitted on the shaft 30 between the hinge ears 34 and the shaft mounting ears 28.

A coiled spring 37 for closing the valve and biassing the half-discs 31 toward closed position is shown in FIGS. 3 and 7 to have its ends 38 extending outward to overlie the downstream face of the discs 31. Grooves 39 are preferably provided to receive the spring ends 38 and keep the spring 37 in position. It will be noted that FIGS. 6 and 7 show that the spring ends 38 extend outward as extensions of the diameter of the spring coil for more effective operation than would be the case if the ends of the spring extended tangentially from the coil. The shape of the spring 37 shown allows the half-discs 31 to move to a back-to-back relationship. The slanted edge 33 of the disc 31 permits the shaft 30 and the spring 37 coiled around the shaft to be located close to the plane of the downstream face of the half-disc 31 without interfering contact with the centerline of the shaft 30 lying in the plane defined by the downstream faces of the half-discs 31, as seen in FIG. 1.

Figure 5:
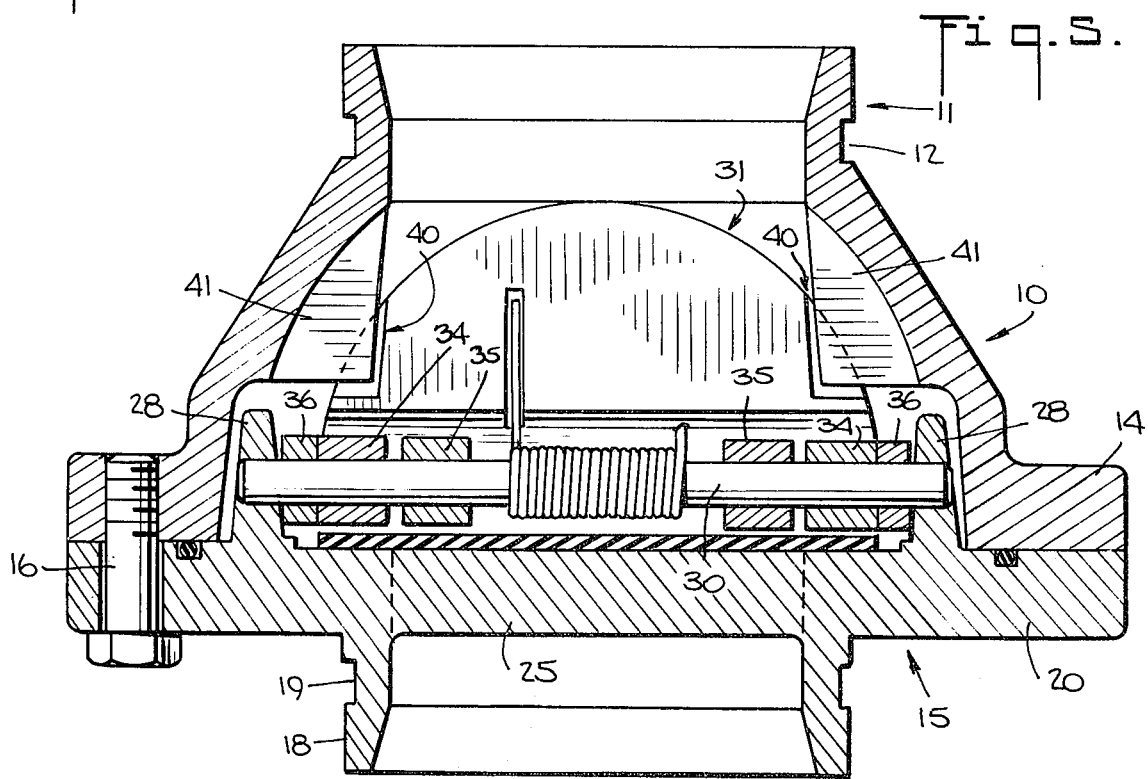
FIG. 5 is a view similar to that of FIG. 2 but with the valve open.

A further feature of the half-disc 31 is the provision of a pair of recesses 40 or areas of reduced thickness located near the ends of the straight disc edge 33 in the downstream face of the half-disc 31. Reference is made to FIGS. 1, 2, 5 and 7 showing a pair of integral wedge-shaped projections 41 extending radially inward from the wall of the flow chamber 13. These projections 40 serve as stops for the half-discs 31 when the valve is in the fully open condition illustrated in FIGS. 4, 5 and 6. The half-discs can move to a position with their downstream faces in contact as seen in FIG. 4 while the stops 41 lie within the space formed by the recessed areas 40 of the opposed half-discs, as seen in FIG. 5. The stops 41 prevent the half-discs 31 from the rotating through an angle greater than 90° without interfering with back-to-back orientation of the half-discs 31. Thus, as shown in FIG. 4, the half-discs 31, when the valve is fully open, do not obstruct flow since their combined cross-sectional area cross the flow chamber 13 is no greater than that of the rib 25 upstream of the half-discs 31.

With the half-discs 31 back-to-back there is no cavity at the enter of the flow to impair flow through the valve. The combination of reduced resistance to flow and the full downstream flow chamber 13 provides very good flow characteristics.

The valve body portion 10 and 15 can be integrally cast of metal, and the gasket G can be of rubber or some other resilient sealing material.

The upstream faces of the half-discs 31 preferably have a central recess or area of reduced thickness provided within the area bounded by the peripheral area of contact between the half-disc 31 and the gasket G as shown in FIGS. 1 and 4.

The flapper type check valve of the invention is suitable for the ordinary uses of check valves in fluid transmission lines of various diameters. The valve of the invention has the advantage of being suited for direct connection to another piping element without the use of an intermediate flanged element. For example, the valve of the invention can be connected directly to a grooved end butterfly valve by means of a simple pipe coupling.

Various modifications, adaptations, changes of size, shape and materials will suggest themselves to those familiar with valves and piping and such departures from the preferred embodiment of the invention shown and described are considered to be within the spirit and scope of the invention.

What is claimed is:

1. A check valve comprising a valve body formed in two parts, a downstream part of said valve body defining a generally bell-shaped flow chamber and an outlet from said flow chamber, and an upstream part of said valve body including an inlet and a shaft mounted transversely with respect to said inlet, said shaft carrying a pair of half-discs mounted for movement from a generally coplanar closed position with said half-discs in contact with a valve seat formed in said upstream valve part to a fully open position with said half-discs resting against stop means within said downstream part of the valve body and wherein said stop means comprise a pair of projections integrally formed with the downstream part of the valve body and said half-discs have recesses located to mate with said projection, and including means allowing said half-discs to move into back-to-back contact when the valve is in fully open condition.

2. The valve of claim 1 wherein said shaft mounted transversely with respect to said inlet is mounted at its ends in a pair of ears extending from said upstream body part into said flow chamber.

3. The valve of claim 1 wherein each half-disc is generally flat and has a downstream face with an arcuate outer edge and said recesses are located at said arcuate outer edge.

4. The valve of claim 3 wherein there are two of said recesses in each half-disc.

5. The valve of claim 3 wherein said downstream face as a slanted portion extending to a straight inner edge and a pair of spaced hinge ears project from said slanted portion, one of said hinge ears being located near one end of said straight inner edge and the other of said hinge ears being spaced from an opposite end of said straight inner edge by a distance at least as great as the width of said one of said hinge ears.

6. A flapper check valve comprising a generally bell-shaped downstream valve body enclosing a flow chamber, said downstream body portion having a cylindrical end defining an outlet from said flow chamber said cylindrical end being formed with an external circumferential groove and a wall widening from said cylindrical end to terminate in an annular peripheral flange, an upstream valve body portion having a flange opposed to and secured to the flange of said downstream body portion, said upstream body portion having a cylindrical end formed with an external circumferential groove and defining an inlet to said flow chamber, an axial opening through said upstream valve body portion and a transverse rib extending across said opening, a pair of ears extending into said flow chamber from said upstream body portion and a shaft mounted in said ears and extending parallel to said transverse rib, a pair of identical half-discs pivotally mounted on said shaft for movement from a generally coplanar closed position in contact with a valve seat area of said upstream part to a back-to-back fully open position, stop means integrally formed within said downstream body portion and recesses in downstream faces of said half-discs positioned to mate with said stop means in said fully open position, and a coiled spring on said shaft for closing said valve.

7. The valve of claim 6 wherein ends of said spring extend radially outward therefrom to permit said half-discs to assume said back-to-back position.

8. The valve of claim 7 wherein said ends of the spring are received in grooves in said downstream faces.

9. The valve of claim 6 wherein said flanges are secured together by bolts and including an O-ring seal between said flanges.

10. A flapper check valve having a two part valve body, one part of said valve body defining an inlet and a flow passage and carrying a pair of pivotally mounted half-discs and including a seat for said half-discs when the valve is in closed condition, the other part of said valve body enclosing a generally bell-shaped flow chamber and having means defining an outlet from said flow chamber said other part having two integrally formed projections serving as stops for said half-discs when the valve is in fully open condition with said flow passage in communication with said flow chamber, said half-discs being mounted to pivot about a shaft from a generally coplanar closed position through an angle of about 90° to a back-to-back open position, said half-discs having recesses for mating with said stops when said half-discs are back-to-back in said open position.

11. The valve of claim 10 wherein each of said valve body parts as a cylindrical end formed with an external circumferential groove for attachment of said valve to other piping elements.

12. The valve of claim 10 wherein said half-discs are generally flat each half-disc has a downstream face with an arcuate outer edge, said recesses being a pair of spaced recesses in said downstream face at said arcuate outer edge, and including a coiled spring on said shaft for closing said valve, ends of said spring being received in grooves in said downstream faces of the half-discs.

* * * * *